Figures 1, 2, 3, 4:
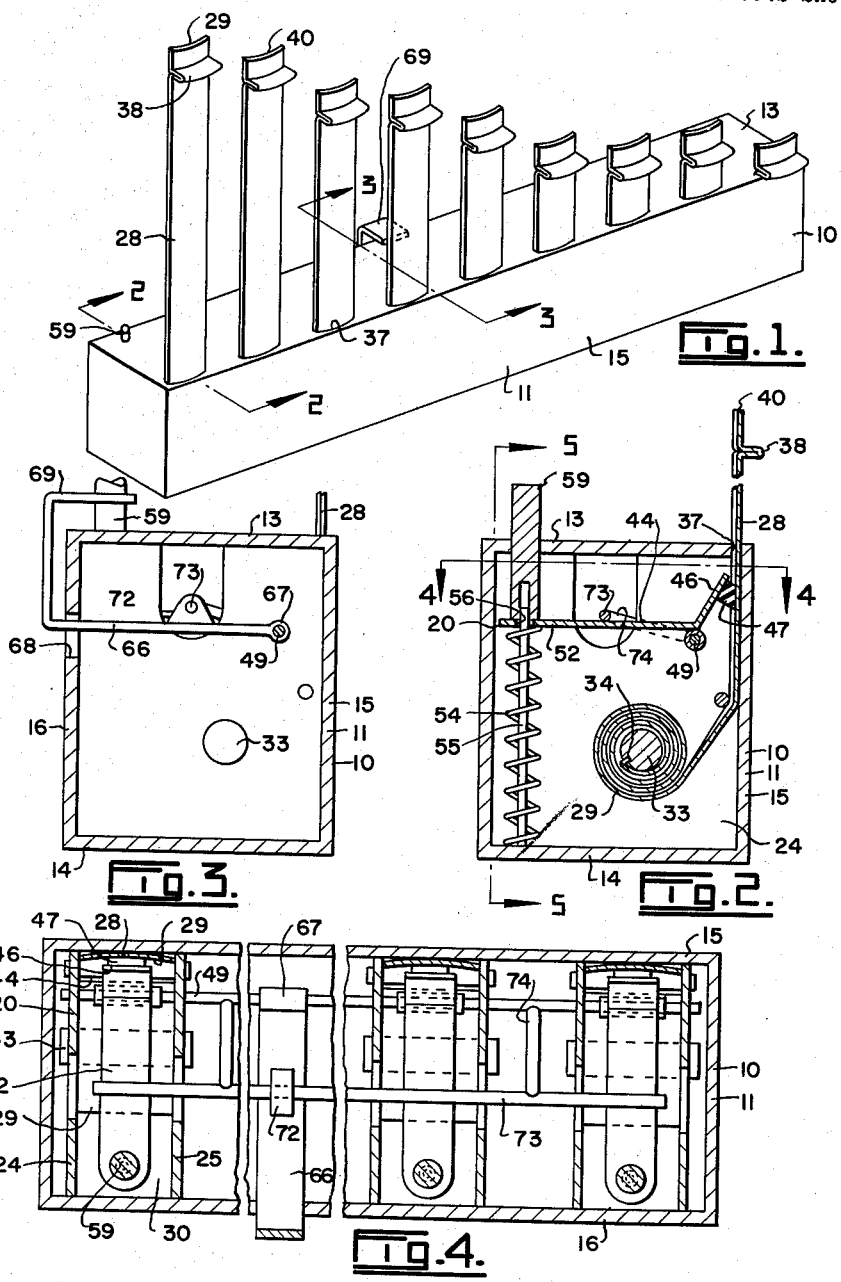

Oct. 11, 1960  R. W. KLINCK ET AL  2,955,563
STATISTICAL INDICATOR
Filed Feb. 11, 1958  3 Sheets-Sheet 2
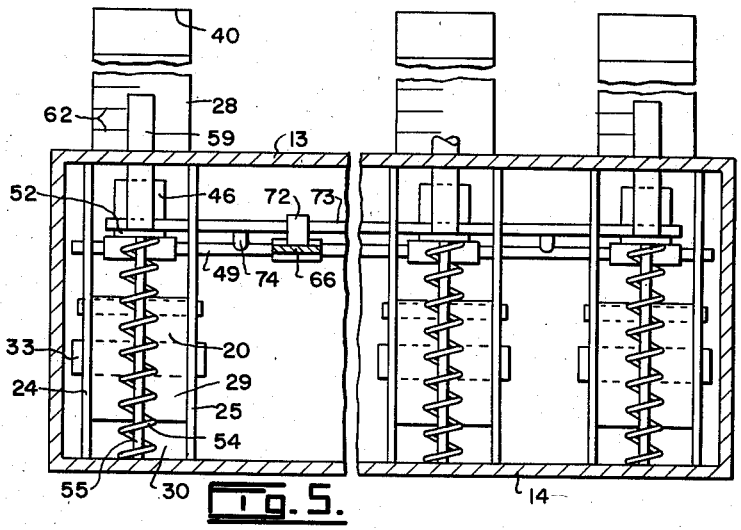
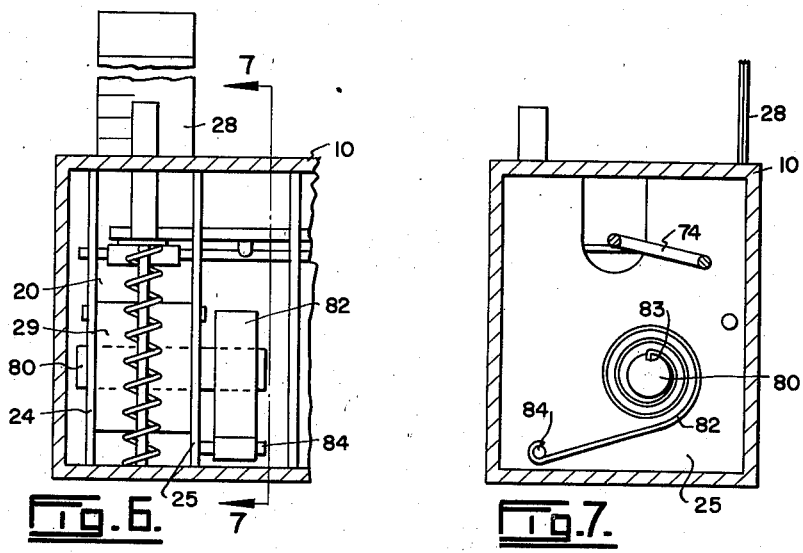
INVENTORS
RONALD WOODWARD KLINCK
LESLIE FRANK PORTER
ROBERT HAMILTON WRIGHT
HENRY ZITKO
BY
*Featherstonhaugh & Co.*
ATTORNEYS Oct. 11, 1960 R. W. KLINCK ET AL 2,955,563
STATISTICAL INDICATOR
Filed Feb. 11, 1958 3 Sheets-Sheet 3

INVENTORS
RONALD WOODWARD KLINCK
LESLIE FRANK PORTER
ROBERT HAMILTON WRIGHT
HENRY ZITKO
BY
Fetherstonhaugh & Co.
ATTORNEYS

United States Patent Office 2,955,563
Patented Oct. 11, 1960

2,955,563

STATISTICAL INDICATOR

Ronald Woodard Klinck, Leslie Frank Porter, Robert Hamilton Wright, and Henry Zitko, all of Vancouver, British Columbia, Canada, assignors to British Columbia Research Council, Vancouver, British Columbia, Canada Filed Feb. 11, 1958, Ser. No. 714,645

7 Claims. (Cl. 116—135)

This invention relates to apparatus by means of which statistical data may be visually indicated.

This statistical indicator is particularly useful as an aid to public speakers since they can construct a series of bar graphs or diagrams embodying different sets of statistics one after another. It is also useful for displaying statistical data, and particularly in conditions where the display must be changed at frequent intervals. The required data may be quickly and easily indicated in a visual manner, and the data may be easily and instantly removed or erased either individual or collectively. The apparatus always stands ready for immediate use regardless of the nature of the data to be displayed in a graphical manner.

The apparatus includes a plurality of tapes that may be drawn outwardly desired distances from the casing to form bars of a graph. The tapes are usually drawn upwardly to form vertical graph bars, and they are so described herein, but it is to be understood that they may be drawn outwardly in other directions if the circumstances warrant it. Scales may be marked on the backs of the tapes to enable the operator to draw them up to appropriate heights required to represent desired statistical quantities. Each tape is retained in its elevated position by releasable means, and the latter may be operated to permit the tape to return into the casing. This return action may be done manually, but it is preferable to construct the tapes and/or the apparatus so that said tapes when released are drawn back into the casing.

A statistical indicator according to the present invention comprises a casing, a stiffly flexible tape wound in a volute coil within the casing and having an outer end projecting from the latter, and clamping means carried by the casing through which said end of the tape extends, said clamping means allowing the tape to be drawn outwardly from the casing and normally preventing it from being returned thereinto and being releasable to permit such return, whereby the outer end of the tape when drawn from the casing projects substantially straight out therefrom to indicate statistical data by the amount of tape exposed.

Figure 8:
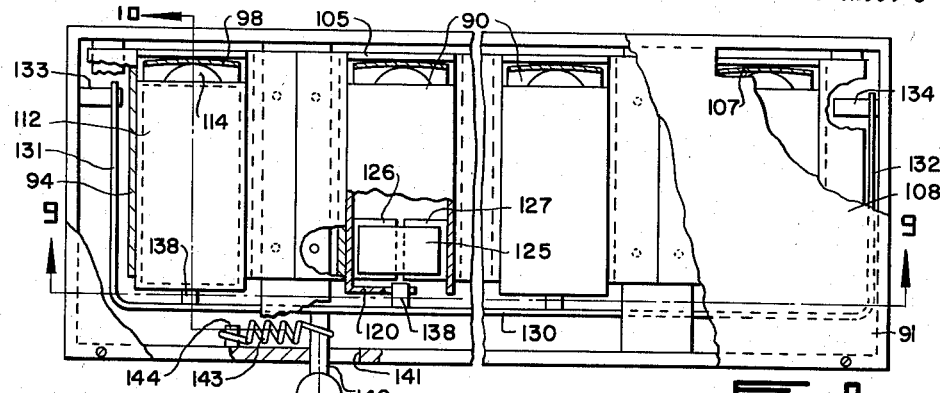
Figure 9:
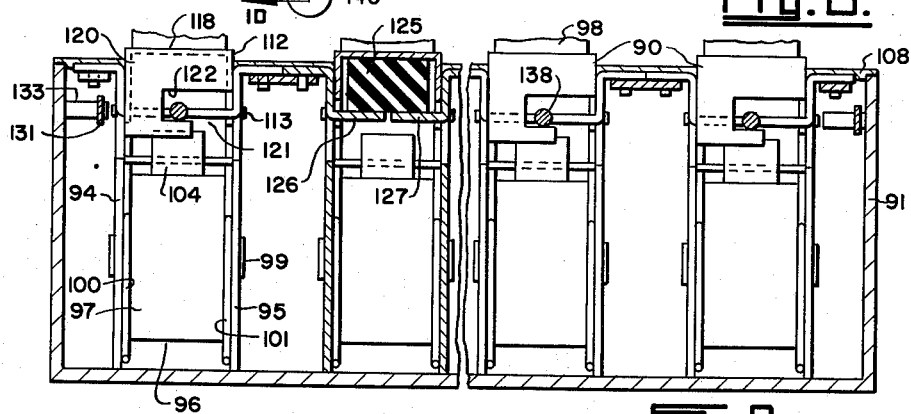
Figures 10, 11:
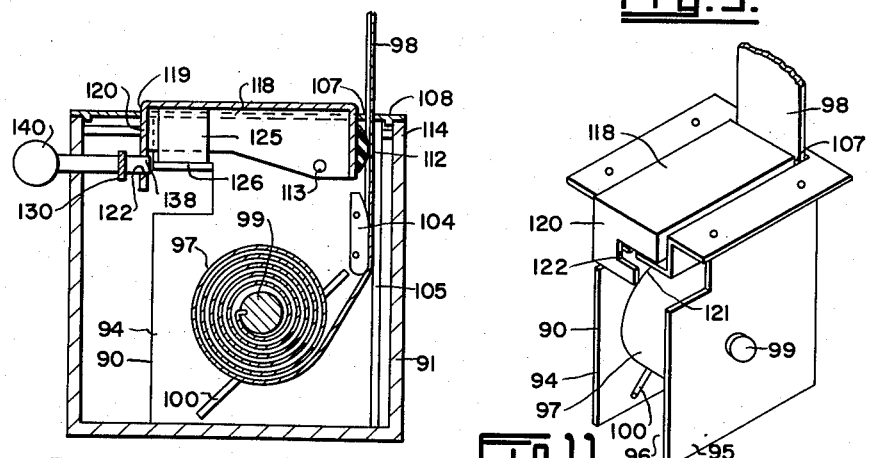

Examples of this invention are illustrated in the accompanying drawings, in which Figure 1 is a perspective view of one form of statistical indicator with the tapes thereof positioned at different heights, Figure 2 is an enlarged vertical section taken substantially on the line 2—2 of Figure 1, Figure 3 is an enlarged vertical section taken substantially on the line 3—3 of Figure 1, Figure 4 is a horizontal sectional view taken on the line 4—4 of Figure 2, Figure 5 is a section taken on the line 5—5 of Figure 2, Figure 6 is a fragmentary sectional view similar to Figure 5, illustrating an alternative form of the invention, Figure 7 is a vertical section taken on the line 7—7 of Figure 6, Figure 8 is a plan view of a casing with most of the top thereof broken away, illustrating still another modification of the invention, Figure 9 is a vertical section taken substantially on the line 9—9 of Figure 8, Figure 10 is a cross section taken on the line 10—10 of Figure 8, and Figure 11 is a perspective view of an indicating unit of the apparatus of Figure 8.

Referring to Figures 1 to 5 of the drawings, 10 is a statistical indicator including a casing 11 of any desired construction. The illustrated casing has a top 13, bottom 14, front wall 15, and back wall 16. The casing includes one or more indicating units 20, the number of these units depending upon the number of indication or bar graphs to be produced by the indicator. It is desirable to make the unit so that any desired number of them may be inserted in a suitable casing.

Each indicating unit 20 includes spaced side or guide plates 24 and 25 that extend between the top, bottom and two walls of casing 11, and are permanently or removably secured in place in any desired manner. A stiffly flexible tape 28 is wound in a volute coil 29 within the compartment 30 formed by side plates 24 and 25. This tape may be formed of any suitable material, such as steel, aluminum alloy or plastic. Rigidity may be provided in a straight length of the tape, while retaining the latter very thin for flexing purposes, by forming it with a shallow transverse curve 29, clearly indicated in Figure 4, this curve extending in a direction outwardly from the coil 29. Suitable material for forming the tape is venetian blind slat stock which is very thin and flexible, and usually is curved in cross section so that it is comparatively rigid when extended in a straight line.

Suitable guides are provided for preventing the tape coil 29 from moving laterally in compartment 30. In this example, side plates 24 and 25 act as the guides since the width of the tape is substantially the same as the width of the compartment.

The coil of tape 28 may set loosely in unit compartment 30, but it is preferable to wind the tape loosely around a central horizontal shaft 33 which extends between and is carried by side plates 24 and 25. The inner end of the tape is preferably anchored to this shaft, as indicated at 34 in Figure 2. As the tape may be drawn tightly into a coil around the shaft, care must be taken that the diameter of the latter is sufficiently large to prevent permanent deformation of the tape when so tightly wound.

Tape 28 extends from its coil 29 upwardly in compartment 30 and through a slot 37 in the casing top 13 which preferably is just large enough to let the tape slide therethrough. A stop 38 is provided at the outer end of the tape to prevent said end from passing downwardly through the slot. In this example, the stop is formed by bending the tape outwardly and back again on itself, and by squeezing the outwardly-extending portions together.

The outer end 40 of tape 28 always projects a little above casing 11 since stop 38 prevents it from moving downwardly into said casing. The tape may be pulled outwardly relative to the casing desired distances to indicate statistical data. If the inner end of the tape is free, and/or shaft 33 is omitted, it will be necessary to move the tape back towards the casing in order to get it into the latter. In this case, the coil would be so confined that the tape has to wind into said coil as it is returned into the casing. However, it is preferably loosely to wind the coil around shaft 33 and to anchor the inner end of the tape to said shaft. In this case, when the tape is drawn outwardly from the casing, the coil tightens around the shaft, and when the tape is released, the springiness of the tape material causes the coil to expand and to draw the tape back into the casing as far as stop 38 permits.

In view of this, it is desirable to provide clamping means carried by the casing which allows the tape to be drawn outwardly and normally prevents it from being returned into the casing, said clamping means being releasable to permit the return of the tape. Although the clamping means may be outside the casing, it is preferable to locate it inside. Clamping means 44 is provided for this purpose.

The clamping means 44 includes a clamping head 46 movably mounted adjacent the tape and extending generally in a direction away from coil 29, see Figure 2. This head is preferably provided with a resilient pad 47 normally bearing against the portion of the tape extending from the coil up through casing slot 37. This head is adapted to press the tape against a stop on the side of the latter remote from and opposite the head. In this example, casing wall 15 forms the stop, and the head presses the tape against said wall.

Head 46 is swingably mounted on and inclined upwardly relative to a shaft 49 which extends through and is carried by unit walls 24 and 25. There may be such a shaft for each of the units in casing 11, but it is preferable to make shaft 49 common to all of said units, as clearly shown in Figures 4 and 5. An arm 52 is connected to head 46 at shaft 49 and extends towards the back wall 16 of the casing. Resilient means is provided for pressing head 46 against the tape, and this may be in the form of a coil spring 54 mounted on a rod 55 extending upwardly from the casing bottom 14 and through a slot 56 in the arm. The spring bears against the casing bottom and the arm and tends to swing the latter upwardly, causing head 46 to rotate around shaft 49 to press the tape against casing wall 15. A plunger 59 rests upon and extends upwardly from arm 52 and slidably through the casing top 13 in line with the portion of tape 28 extending outwardly from the casing. When plunger 59 is depressed against the action of spring 54, head 46 is swung away from the tape to release the latter. The fact that the head is inclined upwardly towards the tape prevents said tape from being moved downwardly unless arm 52 is depressed. The natural tendency of the tape to be drawn downwardly by the portion thereof forming coil 29 tends to swing head 46 towards said tape, thereby jamming it against the stop formed by casing wall 15.

As previously stated, there are a plurality of indicating units 20 in casing 11. These units are placed side by side so that the tapes 28 project outwardly from the casing side by side near front wall 15 thereof, as shown in Figure 1. Any or all of the tapes may be drawn outwardly from the casing to indicate desired statistical data. The positions of the outer ends 40 of the tapes with respect to each other indicate the relative relationship of the indicated data. If desired, each tape 28 may be provided with a scale 62 on the back thereof to enable the operator to draw the tape outwardly an appropriate distance required to represent the desired statistical quantity or value. These scales will help the operator to draw the tapes out to the proper distances relative to each other to provide the desired comparison. When the tapes are drawn outwardly, they are held in the extended positions by clamping heads 46. When it is desired to return a tape to the casing, it is only necessary to depress the plunger 59 that operates the clamping head of that particular tape. As soon as the tape is released, the resiliency of the portion of the tape forming coil 29 draws said tape back into the casing.

It is desirable to be able to clear the machine or, in other words, to release all the tapes at once. This may be done in any convenient manner. In this example, a master plunger 66 is mounted at its inner end 67 on shaft 49, said master plunger extending rearwardly of the casing and through a slot 68 in wall 16. If desired, the outer end of the master plunger may be bent upwardly and over the top of the casing to provide a section 69 conveniently located above the casing top and in line with plungers 59. A lug 72 projects upwardly from plunger 66, and a stiff bar 73 extends through this lug and lies over each of the arms 52 of the indicating units 20 in the casing. With this arrangement, when plunger 66 is depressed, all the arms 52 are depressed at the same time. Bar 73 is stiff enough to depress all of the clamping arms. If desired, the inner end 67 of the master plunger may be fixedly secured to shaft 49, and said shaft may be connected to bar 73 by means of a plurality of connecting pieces 74. In this case, the clamping heads 46 and arms 52 are rotatably mounted on shaft 49. With this arrangement, a depression of plunger 66 rotates shaft 49 and this, in turn, helps to depress bar 73 through the connecting pieces 74.

The operator may return any tape to casing 11 by depressing its plunger 59, or he may clear the entire machine instantly by depressing the master plunger 66.

Referring to Figures 6 and 7, the central shaft of each indicating unit 20 is replaced by a longer shaft 80, which projects laterally from the wall 25 of the unit. The coil 29 of tape 28 is wound around and fixed to this shaft, but instead of relying entirely on the springiness of the material forming the coil, a volute coil spring 82 is wound around the end of shaft 80 outside the indicating unit. The inner end of the tape is anchored to the shaft at 83, while the outer end thereof is anchored by a pin 84 to wall 25 of the unit. The spring 82 is so wound on the shaft that when the coil 29 of the tape is unwound therefrom, the spring coil is tightened, and vice versa.

The only difference between the alternative of Figures 6 and 7, and that of Figures 1 to 5 is that the coil spring 82 is provided for returning each tape 28 to the casing. Such a spring would be used only when the material forming the tape is not strong enough or has not sufficient resiliency or springiness to return the tape to the casing on its own.

Figures 8 to 11 illustrate yet another form of the invention. It operates in the same manner as the previously-described statistical indicator, but it is constructed in such a manner that the indicating units may be quickly inserted into and removed from the indicator casing without disturbing any other units.

A plurality of indicating units 90 are mounted side by side in a casing 91. These units are preferably removably mounted in the casing independently of each other. One of these units is illustrated by itself in Figure 11.

The unit 90 is provided with side plates 94 and 95 forming therebetween a compartment 96 in which the coil 97 of an indicator tape 98 is mounted in the same manner as the coil 29 described above. The coil may be freely mounted in the compartment, or as preferred, it may be mounted on a shaft 99 which is carried by the side plates 94 and 95. The inner end of the spring is preferably anchored to the shaft. The plates themselves may act as guides for the coil or, as shown, rods 100 and 101 may be secured to the inner surfaces of said plates and against which the sides of the tape forming the coil slide, thereby creating a minimum of friction. The tape 98 extends upwardly from its coil between a guide 104 and a rear wall 105 of the indicating unit. The tape extends upwardly through a slot 107 in a cover 108 which is removably mounted on casing 91 over the units therein.

Clamping head 112 is pivotally mounted on a horizontal shaft 113 extending between the unit walls 94 and 95, said head having a pad 114 adapted to bear against tape 98 and to press it against the unit wall 105, said wall acting as a stop opposed to the head. This head extends generally upwardly and away from the tape coil 97 so that downward movement of the tape causes the head to press it against wall 105, thereby stopping any such movement.

An arm 118 is secured to or forms part of head 112 and swings around pin 113. This arm extends upwardly freely through an opening 119 in casing top 108 and lies in a substantially horizontal plane. The rearward end of this arm is formed with a depending flange 120 that has a notch 121 formed therein at a lower corner thereof. A recess 122 is also formed in this flange and communicates with the notch, said recess extending laterally from the notch spaced above the lower edge of the flange, see Figure 9. Spring means is provided for raising the free end of arm 118 to maintain the clamping head against the tape. In this example, a block 125 of suitable resilient material, such as sponge rubber, is fitted beneath the under surface of the arm near its free end and a shelf formed by lugs 126 and 127 partially cut out of plates 94 and 95 and bent inwardly with respect thereto.

It is desirable, although not absolutely necessary, to provide means for clearing all the tapes of the statistical indicator of Figures 8 to 11 at one time. This may be done by a bar 130 extending along casing 91 behind the indicating units 90, see Figure 8. This bar has at its ends arms 131 and 132 projecting outwardly therefrom and swingably mounted on aligned pins 133 and 135 extending inwardly from the end walls of the casing. Bar 130 has a pin 138 connected thereto and projecting inwardly therefrom towards each unit 90, each of these pins being normally located within the recess 122 of the flange 120 of said unit. A plunger 140 is connected to bar 130 and projects outwardly through a slot 141 formed in the front wall of casing 91. A spring 143 is connected at one end to this plunger( and at its opposite end to a post 144 projecting inwardly from the casing. This spring normally draws the plunger and bar 130 to the left, as seen in Figure 8, to maintain the pins 138 in the recesses 122 of the indicating units. If it is desired to remove a unit from the casing, plunger 140 is shifted to the right against the pull of spring 143 to move the pins 138 into line with notches 121 in the unit flanges so that any unit may be lifted upwardly out of the casing at this time.

When this statistical indicator is in use, the tapes 98 are drawn outwardly from the casing to indicate the desired statistical data. Each tape may be released so that it will be returned to the casing by depressing its arm 118. If it is desired to clear all of the tapes at once, plunger 140 is moved downwardly to swing bar 130 and its pins 138 in the same direction. These pins engage the flanges 120 of the various indicating units to depress all of the arms 118, thereby releasing all of the tapes at the same time.

While the coil 97 of tape 98 of each unit 90 is shown mounted on a central shaft 98, it is to be understood that this coil may be free of the shaft or it may be loosely positioned in the unit compartment 96 without the shaft. Furthermore, the spring means of Figures 6 and 7 may be used in connection with this form of the invention.

What we claim as our invention is:

1. A statistical indicator comprising a casing, a plurality of indicating units mounted side by side in the casing; each indicating unit comprising a stiffly flexible tape normally loosely wound in a volute coil within the unit and having an outer end projecting from the latter and the casing, means anchoring the inner end of the coil in the unit, said coil tightening up when the outer end of the tape is drawn outwardly from the casing and expanding under the flexing action of the tape when said outer end is released to draw the latter back to the casing, clamping means carried by the unit through which said outer end of the tape extends, said clamping means allowing the tape to be drawn outwardly from the casing to tighten the tape coil and normally preventing said tape from being returned into the casing under the action of the expanding coil, and individual releasing means for operating the clamping means to release the tape to permit said return as the coil expands under the flexing action of the tape; and master release means carried by the casing for operating all the individual releasing means simultaneously to permit all the tapes to be drawn into the casing under the action of their respective coils.

2. A statistical indicator comprising a casing, a plurality of indicating units mounted side by side in the casing; each indicating unit comprising a stiffly flexible tape normally loosely wound in a volute coil within the unit and having an outer end projecting from the latter and the casing, means anchoring the inner end of the coil in the unit, said coil tightening up when the outer end of the tape is drawn outwardly from the casing and expanding under the flexing action of the tape when said outer end is released to draw the latter back to the casing, a clamping head pivotally mounted adjacent the tape and extending generally upwardly, a stop on the side of the tape remote from and opposite the head, an arm connected to the head, resilient means normally retaining the head against the tape to press the latter against the stop to prevent movement of the tape inwardly towards the coil under the expanding action of the latter, said head pivoting against the action of the resilient means to permit upward movement of the tape when the outer end thereof is drawn outwardly of the casing to tighten the coil, and said arm being movable to pivot the head away from the tape to permit the return thereof into the casing as the coil expands under the flexing action of the tape; and master release means carried by the casing and connected to all the arms for moving all said arms simultaneously to permit all the tapes to be drawn into the casing under the action of their respective coils.

3. A statistical indicator comprising a casing, a plurality of indicating units mounted side by side in the casing; each indicating unit comprising a stiffly flexible tape normally loosely wound in a volute coil within the unit and having an outer end projecting from the latter and the casing means anchoring the inner end of the coil in the unit, said coil tightening up when the outer end of the tape is drawn outwardly from the casing and expanding under the flexing action of the tape when said outer end is released to draw the latter back to the casing, a clamping head pivotally mounted adjacent the tape and extending generally upwardly, a stop on the side of the tape remote from and opposite the head, a substantially horizontal arm connected to the head, resilient means normally retaining the head against the tape to press the latter against the stop to prevent movement of the tape inwardly towards the coil under the expanding action of the latter and to keep the arm in an elevated position, said head pivoting against the action of the resilient means to permit upward movement of the tape when the outer end thereof is drawn outwardly of the casing to tighten the coil and to move the arm to a depressed position, and said arm being movable from the elevated to the depressed position thereof to pivot the head away from the tape to permit the return thereof into the casing as the coil expands under the flexing action of the tape; all the arms of the units being substantially in a common plane, and a bar extending across said arms, and being capable on being moved downwardly of depressing the latter, the outer end of each tape when drawn from the casing projecting substantially straight out therefrom to indicate statistical data by the amount of tape exposed as compared to the amount of any other tape exposed, said bar when it is moved downwardly depressing all the arms simultaneously to permit all the tapes to be drawn into the casing under the action of their respective coils.

4. A statistical indicator comprising a casing, spaced side plates in the casing forming a plurality of compartments side by side therein, a shaft carried by the side plates and extending across the compartments, a stiff flexible tape in each compartment normally loosely wound in a volute coil around the shaft and having an inner end secured to the shaft, each of said tapes extending from its coil upwardly along a wall of the casing and having an outer end projecting above said casing, each coil tightening up when the outer end of its tape is drawn outwardly from the casing and expanding under the flexing action of the tape when said outer end is released to draw the latter back to the casing, a clamping head for each tape swingably mounted on a shaft carried by the plates and inclined upwardly towards said tape, a substantially horizontal arm connected to each head at the shaft on which it is mounted, resilient means normally urging the end of each arm remote from the head of said arm upwardly to move said latter head to press the tape against the casing wall to prevent movement of the tape inwardly towards its coil, said heads pivoting against the action of their respective resilient means to permit upward movement of the tapes when the outer ends thereof are drawn outwardly of the casing to tighten the coils around the shaft, and a plunger extending upwardly from the remote end of each arm, each plunger on being depressed moving the arm thereof against the resilient means of said arm to move the head away from the tape thereby permitting the tape to be drawn back into the casing by the coil thereof, the outer end of each tape when drawn from the casing projecting substantially straight out therefrom to indicate statistical data by the amount of tape exposed as compared to the amount of any other tape exposed.

5. A statistical indicator as claimed in claim 4 including thin spacing means along the inner surface of each side plate of each compartment to keep the tape coil away from said plate.

6. A statistical indicator comprising a casing, a plurality of independent indicating units removably mounted side by side in the casing; each indicating unit comprising spaced side plates forming a compartment, a shaft carried by the side plates and extending across the compartment, a stiff flexible tape in the compartment normally loosely wound in a volute coil around the shaft having an inner end secured to the shaft and an outer end projecting from the casing, said coil tightening up when the outer end of the tape is drawn outwardly from the casing and expanding under the flexing action of the tape when said outer end is released to draw the latter back to the casing, a clamping head swingably mounted on a shaft carried by the plates and extending towards the tape in a direction away from the coil, a stop connected to the side plates and extending on the side of the tape remote from and opposite the head, a substantially horizontal arm connected to the head near the shaft on which it is mounted and extending along the top of the compartment, resilient means normally urging the end of the arm remote from the head upwardly to move said head to press the tape against the stop to prevent movement of the tape inwardly towards the coil, said head pivoting against the action of the resilient means to permit upward movement of the tape when the outer end thereof is drawn outwardly of the casing to tighten the coil around the shaft, said arm on being swung downwardly against the resilient means moving the head away from the tape thereby permitting the tape to be drawn back into the casing by the coil thereof, the outer end of the tape when drawn from the casing projecting substantially straight out therefrom to indicate statistical data by the amount of tape exposed as compared to the amount of tape of any other unit exposed.

7. A statistical indicator comprising a casing, a plurality of independent indicating units removably mounted side by side in the casing; each indicating unit comprising spaced side plates forming a compartment, a shaft carried by the side plates and extending across the compartment, a stiff flexible tape in the compartment normally loosely would in a volute coil around the shaft having an inner end secured to the shaft and an outer end projecting from the casing, said coil tightening up when the outer end of the tape is drawn outwardly from the casing and expanding under the flexing action of the tape when said outer end is released to draw the latter back to the casing, a clamping head swingably mounted on a shaft carried by the plates and extending towards the tape in a direction away from the coil, a stop connected to the side plates and extending on the side of the tape remote from and opposite the head, a substantially horizontal arm connected to the head near the shaft on which it is mounted and extending along the top of the compartment, resilient means normally urging the end of the arm remote from the head upwardly to move said head to press the tape against the stop to prevent movement of the tape inwardly towards the coil, said head pivoting against the action of the resilient means to permit upward movement of the tape when the outer end thereof is drawn outwardly of the casing to tighten the coil around the shaft, said arm on being swung downwardly against the resilient means moving the head away from the tape thereby permitting the tape to be drawn back into the casing by the coil thereof, the outer end of the tape when drawn from the casing projecting substantially straight out therefrom to indicate statistical data by the amount of tape exposed as compared to the amount of tape of any other unit exposed; and master release means arranged to depress all the arms simultaneously to permit all the tapes to be drawn into the casing under the action of their respective coils.

References Cited in the file of this patent
UNITED STATES PATENTS

| | | |
|---|---|---|
| 2,168,443 | Johnson | Aug. 8, 1939 |
| 2,503,440 | Johanningmeier | Apr. 11, 1950 |
| 2,684,534 | Ljungberg | July 27, 1954 |
| 2,803,075 | Pearne | Aug. 20, 1957 |